(12) United States Patent
Zeng et al.

(10) Patent No.: US 11,863,044 B1
(45) Date of Patent: Jan. 2, 2024

(54) MOTOR FOR HIGH-SPEED ELECTRIC HAIR DRYER WITH CONCAVE MOTOR BRACKET AND TWO BEARINGS ARRANGED ON CONCAVE MOTOR BRACKET

(71) Applicant: Shenzhen Zijia Technology Co., Ltd, Guangdong (CN)

(72) Inventors: Yanping Zeng, Guangdong (CN); Xiping Li, Guangdong (CN)

( * ) Notice: Subject to any disclaimer, the term of this patent is extended or adjusted under 35 U.S.C. 154(b) by 0 days.

(21) Appl. No.: 18/303,777

(22) Filed: Apr. 20, 2023

(30) Foreign Application Priority Data

Sep. 5, 2022 (CN) .......................... 202222352288.1

(51) Int. Cl.
| | |
|---|---|
| *H02K 5/173* | (2006.01) |
| *H02K 5/20* | (2006.01) |
| *H02K 7/08* | (2006.01) |
| *H02K 9/06* | (2006.01) |
| *H02K 11/33* | (2016.01) |

(52) U.S. Cl.
CPC ........... *H02K 5/1732* (2013.01); *H02K 5/207* (2021.01); *H02K 7/083* (2013.01); *H02K 9/06* (2013.01); *H02K 11/33* (2016.01)

(58) Field of Classification Search
CPC ........ H02K 5/16; H02K 5/161; H02K 5/1732; H02K 5/20; H02K 5/207; H02K 7/083; H02K 9/02; H02K 9/04; H02K 9/06
See application file for complete search history.

(56) References Cited

U.S. PATENT DOCUMENTS

| | | | | |
|---|---|---|---|---|
| 2008/0304986 | A1* | 12/2008 | Kenyon ................. | H02K 1/185 417/423.12 |
| 2021/0344250 | A1* | 11/2021 | Kim ....................... | A45D 20/12 |
| 2023/0092355 | A1* | 3/2023 | Gui ........................ | H02K 11/33 310/51 |

FOREIGN PATENT DOCUMENTS

| | | | | | |
|---|---|---|---|---|---|
| CN | 2017196427 | A | * | 9/2017 | |
| CN | 109639030 | A | * | 4/2019 | ............. A45D 20/10 |
| CN | 210867306 | U | * | 6/2020 | ........... F04D 19/002 |
| JP | 2012097655 | | * | 5/2012 | |
| KR | 20200099853 | A | * | 8/2020 | |

OTHER PUBLICATIONS

Zhong, Machine Translation of CN210867306, Jun. 2020 (Year: 2020).*

(Continued)

*Primary Examiner* — Eric Johnson

(57) ABSTRACT

The present disclosure provides a motor for a high-speed electric hair dryer. The motor for the high-speed electric hair dryer includes: an air duct shell, a stator mechanism, a rotor mechanism, blades and a concave motor bracket. The rotor mechanism includes a rotating shaft, a first bearing, a second bearing and a magnetic ring. The stator mechanism is fixed in the concave motor bracket. Installation holes for installing the first bearing and the second bearing are formed in two ends of the concave motor bracket. A semicircular machine cover is arranged on the concave motor bracket. The magnetic ring is arranged in the stator mechanism, the concave motor bracket is fixed in the air duct shell. The rotating shaft passes through one end of the first bearing and is connected to the blades, and the blades are installed in the air duct shell.

12 Claims, 5 Drawing Sheets

(56) References Cited

OTHER PUBLICATIONS

Wang, Machine Translation of CN109639030, Apr. 2019 (Year: 2019).*
Myungkeun, Machine Translation of KR20200099853, Aug. 2020 (Year: 2020).*
Tong, Machine Translation of CN2017196427, Sep. 2017 (Year: 2017).*
Takeshita, JP2012097655, May 2012 (Year: 2012).*

* cited by examiner

MOTOR FOR HIGH-SPEED ELECTRIC HAIR DRYER WITH CONCAVE MOTOR BRACKET AND TWO BEARINGS ARRANGED ON CONCAVE MOTOR BRACKET

CROSS-REFERENCE TO RELATED APPLICATIONS

The application claims priority of Chinese patent application CN202222352288.1, filed on Sep. 5, 2022, which is incorporated herein by reference in its entireties.

TECHNICAL FIELD

The present disclosure belongs to the technical field of motors, and particularly relates to a motor for a high-speed electric hair drier dryer.

BACKGROUND

At present, a motor used in a electric hair dryer, a bladeless fan, a negative pressure vacuum cleaner, a hand dryer, bathroom drying and the like usually adopts a single-cantilever structure, that is, two motor bearings are installed at one side, and a stator and a rotor of the motor are installed at the other side, this structure has the advantage that two bearing holes have high coaxiality and two bearings installed on an axis also have high coaxiality, thereby ensuring the service life of the bearing. However, this structure has a higher requirement on a bearing capacity of the motor, and this structure may enlarge vibration, caused by unbalanced quantity of the rotor, during a rotating process of the rotor, and a high-pitched resonant noise generates through resonance.

Therefore, a motor for a high-speed electric hair dryer is proposed, in order to solve deficiencies in the prior art.

SUMMARY

To solve the above-mentioned problems, the present disclosure provides a motor for a high-speed electric hair dryer, so that the running speed allowed by the motor is higher, the motor noise is less, the service life of the motor is longer, the motor has better radiation and is more reliable.

The technical solution adopted by the present disclosure to solve the technical problem is as follows. The motor for the high-speed electric hair dryer includes: an air duct shell, a stator mechanism, a rotor mechanism, blades and a concave motor bracket, wherein the rotor mechanism includes a rotating shaft, a first bearing, a second bearing and a magnetic ring, the magnetic ring is fixedly sleeved on a middle of the rotating shaft, two ends of the rotating shaft are respectively inserted from inner holes of the first bearing and the second bearing, the stator mechanism is fixed in the concave motor bracket, installation holes for installing the first bearing and the second bearing are formed in two ends of the concave motor bracket, a semicircular machine cover is arranged on the concave motor bracket, the magnetic ring is arranged in the stator mechanism, the concave motor bracket is fixed in the air duct shell, one and of the rotating shaft passing through the first bearing is connected to the blades, and the blades are installed in the air duct shell.

On the basis of the technical scheme, the present disclosure can also make the following improvements.

Further, the stator mechanism includes a stator core, a stator winding, a conductive column and a PCB (Printed Circuit Board) board, the stator winding is fixedly arranged in the stator core, the stator core is fixed in the concave motor bracket, and the PCB board is connected to the stator winding through the conductive column.

Further, the stator mechanism further includes a first positioning sleeve and a second positioning sleeve, which are all sleeved on the rotating shaft, and the magnetic ring is arranged between the first positioning sleeve and the second positioning sleeve.

Further, a spring is arranged between the first positioning sleeve and the first bearing, and the spring is sleeved on the rotating shaft.

Further, a cylindrical structure is formed by the concave motor bracket and the semicircular machine cover, and two ends of the cylindrical structure are all provided with ventilating ports.

Further, the shape of each blade is an Archimedes spiral curved surface.

Further, a plurality of air guide plates are uniformly arranged in the air duct shell.

Further, the stator mechanism is integrally molded by adopting injection in an iron core mold.

The technical solution adopted by the present disclosure to solve the technical problem is also as follows. The motor for the high-speed electric hair dryer includes: an air duct shell, a stator mechanism, a rotor mechanism, blades and a motor bracket, wherein the rotor mechanism includes a rotating shaft, a first bearing, a second bearing and a magnetic ring, the magnetic ring is sleeved on a middle of the rotating shaft, two ends of the rotating shaft are respectively inserted into inner holes of the first bearing and the second bearing, the stator mechanism is fixed in the motor bracket, two installation holes for installing the first bearing and the second bearing are formed in two ends of the motor bracket, the magnetic ring is arranged in the stator mechanism, the motor bracket is fixed in the air duct shell, one end of the rotating shaft passing through the first bearing is connected to the blades, and the blades are installed in the air duct shell.

Further, the motor bracket includes a side wall, a first installing portion, a second installing portion, a first connection portion and a second connection portion, a cross-section of the side wall is arced shaped and an accommodate space for accommodating the stator mechanism is defined by the side wall, the first installing portion includes the installation hole for installing the first bearing, the second installing portion includes the installation hole for installing the second bearing, the first connection portion is connected between one end of the side wall and the first installing portion, the second connection portion is connected between the other end of the side wall and the second installing portion, and the side wall, the first installing portion, the second installing portion, the first connection portion and the second connection portion are integrated in one piece by a molding process.

Further, the a plurality of first though holes is located at the first connection portion, and a plurality of second though holes is located at the second connection portion.

Further, a semicircular machine cover is configured to connect with the side wall and cover a side of the stator mechanism away from the side wall.

Further, the stator mechanism includes a stator core, a stator winding, a conductive column and a PCB (Printed Circuit Board) board, the stator winding is fixedly arranged in the stator core, the stator core is fixed in the concave motor bracket, and the PCB board is connected to the stator winding through the conductive column.

Further, the stator mechanism further includes a first positioning sleeve and a second positioning sleeve, which are all sleeved on the rotating shaft, and the magnetic ring is arranged between the first positioning sleeve and the second positioning sleeve.

Further, a spring is arranged between the first positioning sleeve and the first bearing, and the spring is sleeved on the rotating shaft.

Further, the shape of each blade is an Archimedes spiral curved surface.

Further, a plurality of air guide plates are uniformly arranged in the air duct shell.

Further, the stator mechanism is integrally molded by adopting injection in an iron core mold.

Beneficial effects: the two bearings can be installed at the two ends of the motor stator and the motor rotor through the concave motor bracket, and molded by processing, in order to ensure the coaxiality of the two installation holes. The rotating speed allowed by the motor is higher, the service life is longer, with a strong rigidity, the motor running is relatively stable, and the motor has less vibration and less noise.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE EMBODIMENTS

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

In an ultrahigh speed wind motor structure in the related technology, two bearings need to be installed on two end cover parts, which will cause tolerance accumulation, so consistency of the coaxiality of two bearing chambers cannot be ensured, if the error is great, the two bearings do not work on the same axis, and the motor does not on the same axis when running at a high speed, the service life of the bearing cannot be ensured, finally the bearing is burnt, and the service life of the motor is shortened.

Figure 5:
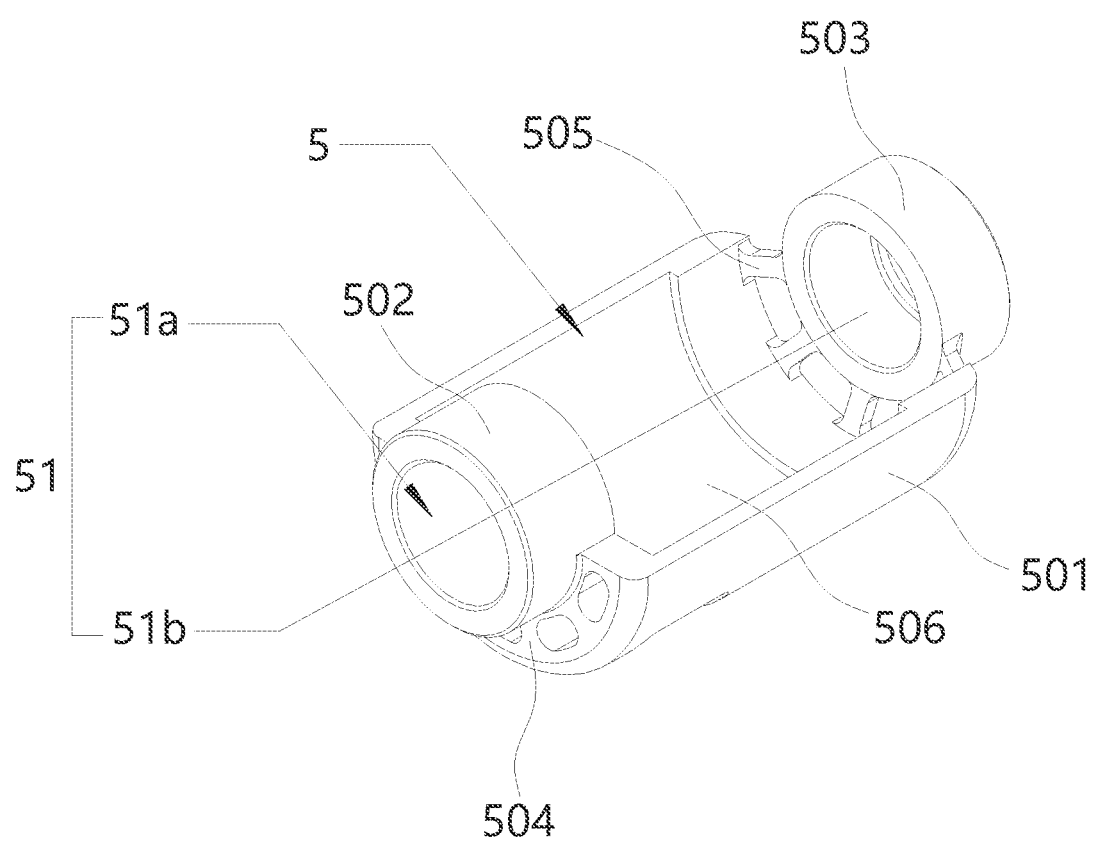
FIG. 5 is a structural schematic diagram between concave motors.

As shown in FIG. 1 to FIG. 5, this embodiment provides a motor for a high-speed electric hair dryer, so that the running speed allowed by the motor is higher, the motor noise is less, the service life of the motor is longer, the motor has better radiation and is more reliable. The motor for the high-speed electric hair dryer includes: an air duct shell 1, a stator mechanism 2, a rotor mechanism 3, blades 4 and a concave motor bracket 5, where the blades 4 and the stator mechanism 2 are all installed in the air duct shell 1, and the stator mechanism 2 may be integrally molded by adopting injection in an iron core mold. The rotor mechanism 3 includes a rotating shaft 31, a first bearing 32, a second bearing 33 and a magnetic ring 34, the magnetic ring 34 is fixedly sleeved on a middle of the rotating shaft 31, two ends of the rotating shaft 31 are respectively inserted from inner holes of the first bearing 32 and the second bearing 33, the stator mechanism 2 is fixed in the concave motor bracket 5, installation holes 51 for installing the first bearing 32 and the second bearing 33 are formed in two ends of the concave motor bracket 5, a semicircular machine cover 6 is arranged on the concave motor bracket 5, the magnetic ring 34 is arranged in the stator mechanism 2, the concave motor bracket 5 is fixed in the air duct shell 1, one end of the rotating shaft 31 passing through the first bearing 32 is connected to the blades 4, and the blades 4 are installed in the air duct shell 1. Referring to FIG. 5, the motor bracket 5 can include a side wall 501, a first installing portion 502, a second installing portion 503, a first connection portion 504 and a second connection portion 505. A cross-section of the side wall 501 is arced shaped, and an accommodate space 506 for accommodating the stator mechanism 2 is defined by the side wall 501. the first installing portion 502 includes a first installation hole 51a for installing the first bearing 32, the second installing portion 503 includes a second installation hole 51b for installing the second bearing 33. The first connection portion 504 is connected between one end of the side wall 501 and the first installing portion 502, the second connection portion 505 is connected between the other end of the side wall 501 and the second installing portion 503. The side wall 501, the first installing portion 502, the second installing portion 503, the first connection portion 504 and the second connection portion 505 are integrated in one piece by a molding process. The semicircular machine cover 6 is configured to connect the side wall 501 to fix the stator mechanism 2 in the accommodate space 506, and a cross-section of the semicircular machine cover 6 is arced shaped.

Figure 1:
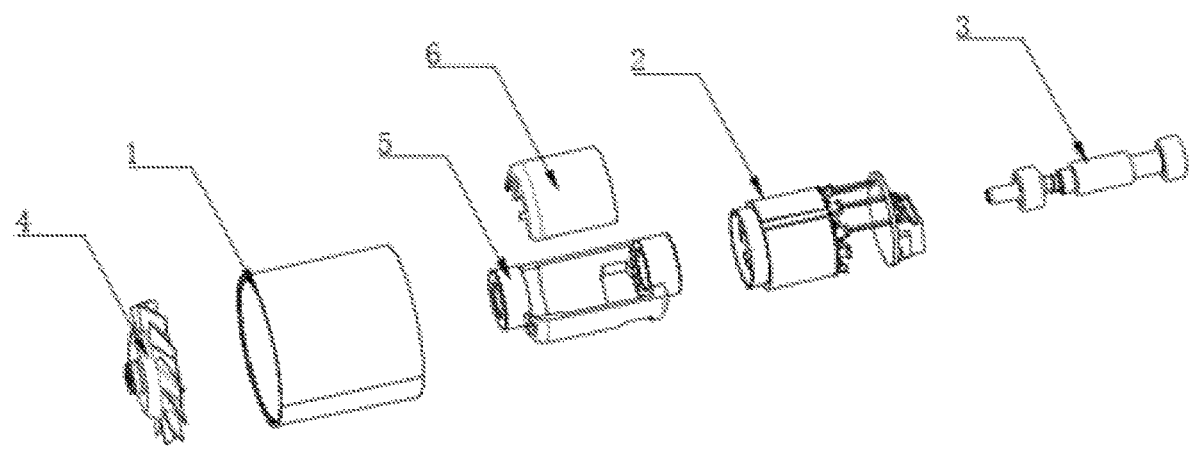
FIG. 1 is an exploded drawing of present disclosure.
Figure 2:
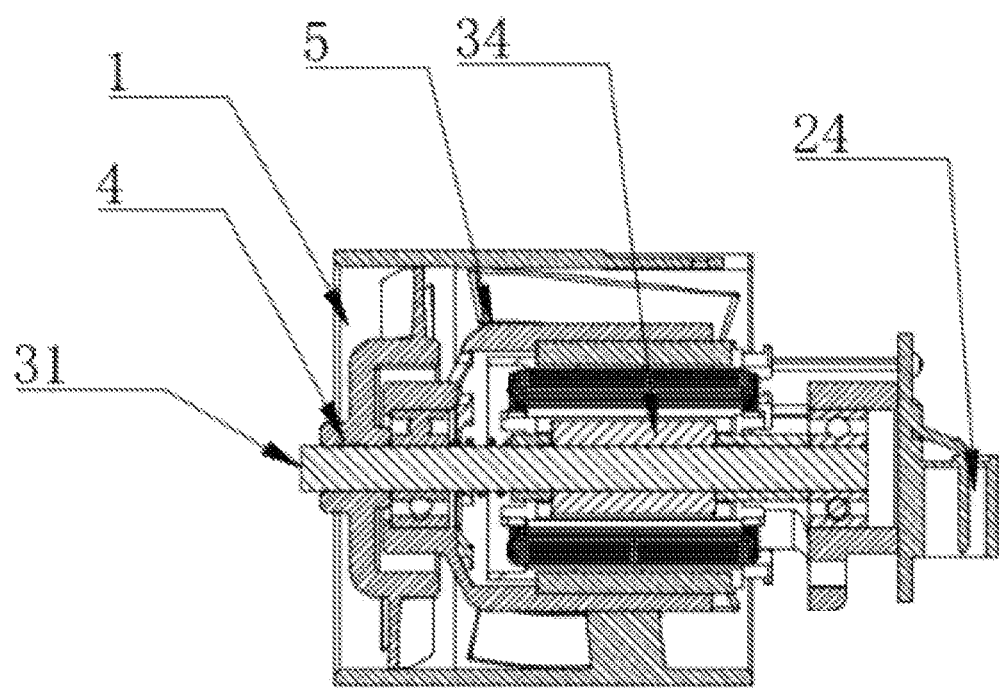
FIG. 2 is a sectional view of present disclosure.

As shown in FIG. 2, the stator mechanism 2 includes a stator core 21, a stator winding 22, a conductive column 23 and a PCB board 24, the stator winding 22 is fixedly arranged in the stator core 21, the stator core 21 is fixed in the concave motor bracket 5, and the PCB board 24 is connected to the stator winding 22 through the conductive column 23.

Figure 3:
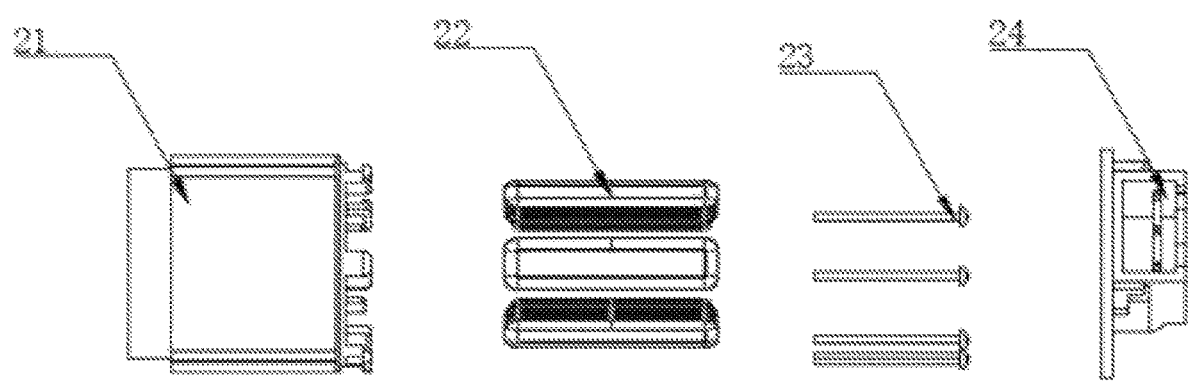
FIG. 3 is an exploded drawing of a stator mechanism.
Figure 4:
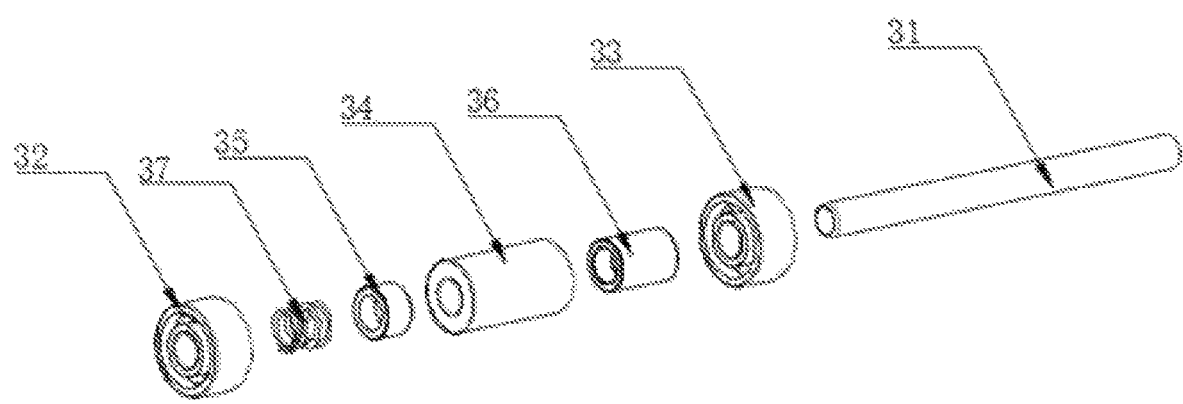
FIG. 4 is an exploded drawing of a rotor mechanism.

As shown in FIG. 3, the stator mechanism 3 further includes a first positioning sleeve 35 and a second positioning sleeve 36, which are all sleeved on the rotating shaft 31, and the magnetic ring 34 is arranged between the first positioning sleeve 35 and the second positioning sleeve 36; and a spring 37 is arranged between the first positioning sleeve 35 and the first spring 32, and the spring 37 is sleeved on the rotating shaft 31. The magnetic ring 34 and the positioning sleeves are adhered to the rotating shaft 31 through an adhesive, and the spring 37 pre-presses an inner ring of the bearing to ensure the reliability of the bearing during high-speed running.

A cylindrical structure is formed by the concave motor bracket 5 and the semicircular machine cover 6, and two ends of the cylindrical structure are all provided with ventilating ports, so the cylindrical structure belongs a semi-opening structure. When the motor runs, airflow enters the motor through the ventilating ports on the shell, so as to take away an internal temperature, meanwhile the airflow is radiated through an air duct, the motor has a double-cooling effect, so that a high temperature radiating temperature, generated by the motor during the running process, is completely solved.

The shape of each blade 4 is an Archimedes spiral curved surface.

A plurality of air guide plates are uniformly arranged in the air duct shell 1, and preferably, 7 or 9 air guide plates may be provided.

Beneficial effects: the two bearings can be installed at the two ends of the motor stator and the motor rotor through the concave motor bracket 5, and molded by processing, in order to ensure the coaxiality of the two installation holes 51. The rotating speed allowed by the motor is higher, the service life is longer, with a strong rigidity, the motor running is relatively stable, and the motor has less vibration and less noise. The motor main body is separated from the air duct, the motor shell is also separating, and the two ends of the motor shell are provided with the ventilating ports, so the motor shell belongs the semi-opening structure. When the motor runs, the airflow enters the motor through the ventilating ports on the shell, so as to take away the internal temperature, meanwhile, the airflow is radiated through the air duct, and the motor has a double-cooling effect, so that the high temperature radiating temperature, generated by the motor during the running process, is completely solved.

In the description of the present disclosure, It is to be understood that, The terms "center", "longitudinal", "transverse", "upper", "lower", "front", "rear", "left", "right", "vertical", "horizontal", "top", "bottom", "inner", "outer", "clockwise", "counterclockwise", and the like indicate azimuth or positional relationships based on the azimuth or positional relationships shown in the drawings, For purposes of convenience only of describing the present disclosure and simplifying the description, Rather than indicating or implying that the indicated device or element must have a particular orientation, be constructed and operated in a particular orientation, therefore, not to be construed as limiting the present disclosure; in addition, The terms "first" and "second" are used for descriptive purposes only, While not to be construed as indicating or implying relative importance or implicitly specifying the number of technical features indicated thereby, features defining "first," "second," and "second" may explicitly or implicitly include one or more of the described features. In the description of the present disclosure, "multiple" means two or more unless explicitly specified otherwise.

Unless otherwise indicate D, "multiple" means two or more.

In addition, the terms "mounted", "disposed", "provided", "connected", "connected", and "socket" are to be construed broadly to mean, for example, a fixed connection, a detachable connection, or an integral construction; It may be a mechanical connection, or an electrical connection; The specific meaning of the above-mentioned terms in the present disclosure will be understood by those of ordinary skill in the art as the case may be, either directly, or indirectly, via an intermediate medium, or internal communication between two devices, elements, or components. The specific meanings of these terms in the present disclosure will be understood by those of ordinary skill in the art as the case may be.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. A motor for a high-speed electric hair dryer, comprising:
an air duct shell, a stator mechanism, a rotor mechanism, blades and a concave motor bracket, wherein the rotor mechanism comprises a rotating shaft, a first bearing, a second bearing and a magnetic ring, the magnetic ring is fixedly sleeved on a middle of the rotating shaft, two ends of the rotating shaft are respectively inserted from inner holes of the first bearing and the second bearing, the stator mechanism is fixed in the concave motor bracket, installation holes for installing the first bearing and the second bearing are formed in two ends of the concave motor bracket, a semicircular machine cover is arranged on the concave motor bracket, the magnetic ring is arranged in the stator mechanism, the concave motor bracket is fixed in the air duct shell, one end of the rotating shaft passing through the first bearing is connected to the blades, and the blades are installed in the air duct shell.

2. The motor for the high-speed electric hair dryer according to claim 1, wherein the stator mechanism comprises a stator core, a stator winding, a conductive column and a PCB, the stator winding is fixedly arranged in the stator core, the stator core is fixed in the concave motor bracket, and the PCB is connected to the stator winding through the conductive column.

3. The motor for the high-speed electric hair dryer according to claim 1, wherein the rotor mechanism further comprises a first positioning sleeve and a second positioning sleeve, which are all sleeved on the rotating shaft, and the magnetic ring is arranged between the first positioning sleeve and the second positioning sleeve.

4. The motor for the high-speed electric hair dryer according to claim 3, wherein a spring is arranged between the first positioning sleeve and the first bearing, and the spring is sleeved on the rotating shaft.

5. The motor for the high-speed electric hair dryer according to claim 1, wherein a cylindrical structure is formed by the concave motor bracket and the semicircular machine cover, and two ends of the cylindrical structure are all provided with ventilating ports.

6. The motor for the high-speed electric hair dryer according to claim 1, wherein each blade extends along an Archimedes spiral.

7. The motor for the high-speed electric hair dryer according to claim 1, wherein a plurality of air guide plates are uniformly arranged in the air duct shell.

8. The motor for the high-speed electric hair dryer according to claim 1, wherein the stator mechanism is integrally molded by adopting injection in an iron core mold.

9. The motor for the high-speed electric hair dryer according to claim 1, wherein the motor bracket comprises a side wall, a first installing portion, a second installing portion, a first connection portion and a second connection portion, a cross-section of the side wall is arced shaped and an accommodate space for accommodating the stator mechanism is defined by the side wall, the first installing portion comprises the installation hole for installing the first bearing, the second installing portion comprises the installation hole for installing the second bearing, the first connection portion is connected between one end of the side wall and the first installing portion, the second connection portion is connected between the other end of the side wall and the second installing portion, and the side wall, the first installing portion, the second installing portion, the first connection portion and the second connection portion are integrated in one piece by a molding process.

10. The motor for the high-speed electric hair dryer according to claim 9, wherein a plurality of first though holes is located at the first connection portion, and a plurality of second though holes is located at the second connection portion.

11. The motor for the high-speed electric hair dryer according to claim 9, wherein the semicircular machine cover is configured to connect with the side wall and cover a side of the stator mechanism away from the side wall.

12. The motor for the high-speed electric hair dryer according to claim 9, wherein the semicircular machine cover is configured to connect the side wall to fix the stator mechanism in the accommodate space, and a cross-section of the semicircular machine cover is arced shaped.

\* \* \* \* \*